No. 757,433. PATENTED APR. 19, 1904.
H. W. BECHT.
REDUCING MILL.
APPLICATION FILED MAY 20, 1903.
NO MODEL.
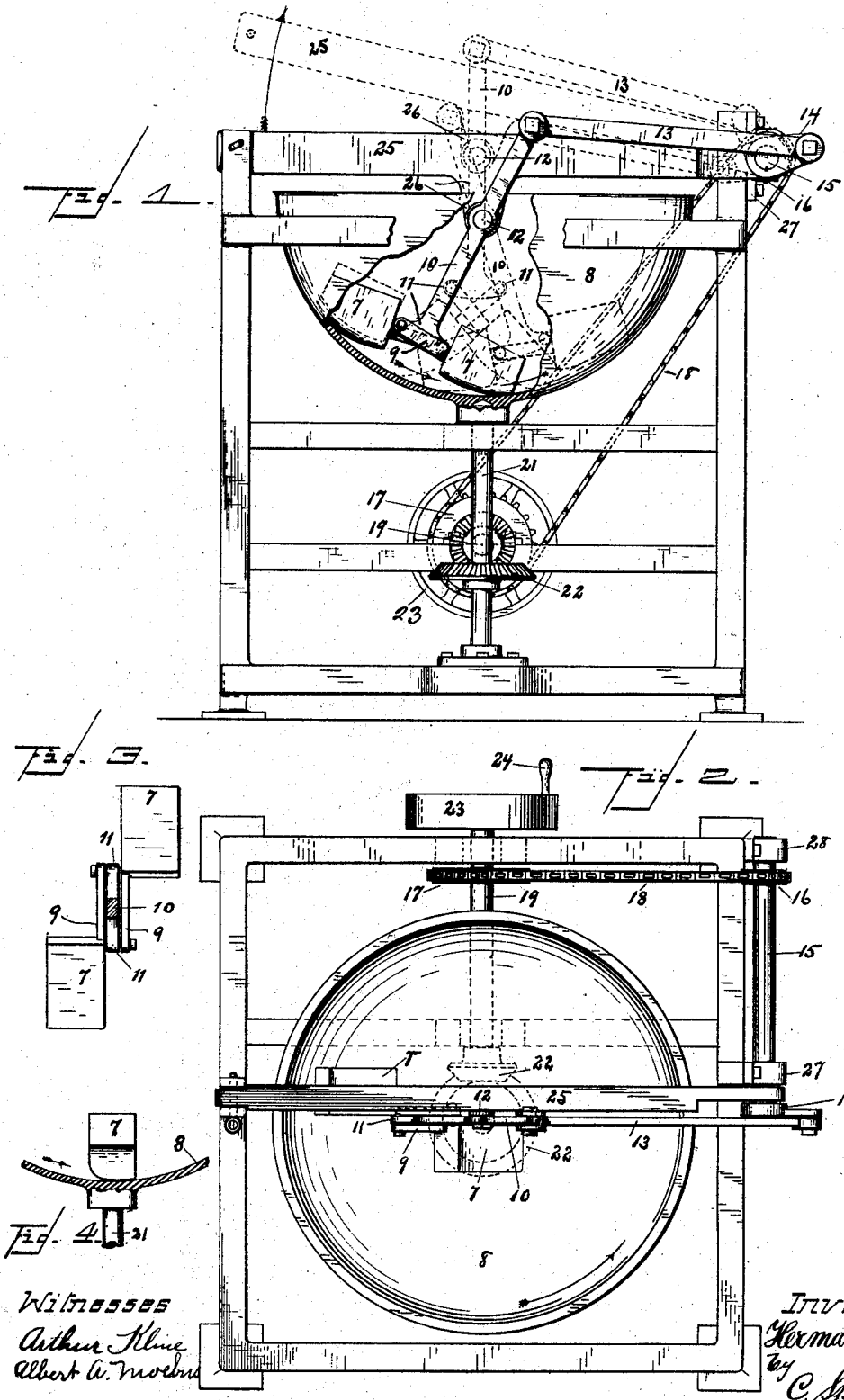
Witnesses
Arthur Kline
Albert A. Moebus
Inventor
Herman W. Becht
by
C. Spengel atty.
THE NORRIS PETERS CO., PHOTO-LITHO., WASHINGTON, D. C.

No. 757,433. Patented April 19, 1904.

UNITED STATES PATENT OFFICE.

HERMAN W. BECHT, OF CINCINNATI, OHIO.

REDUCING-MILL.

SPECIFICATION forming part of Letters Patent No. 757,433, dated April 19, 1904.

Application filed May 20, 1903. Serial No. 157,897. (No model.)

*To all whom it may concern:*

Be it known that I, HERMAN W. BECHT, a citizen of the United States, residing in the city of Cincinnati, in the county of Hamilton and State of Ohio, have invented certain new and useful Improvements in Reducing-Mills; and I do declare the following to be a clear, full, and exact description thereof, attention being called to the accompanying drawings, with the reference-figures marked thereon, which form also a part of this specification.

This invention relates to improvements in reducing-mills, the object being to provide a mill for reducing and pulverizing matter like spices, roots, herbs, granulated substances like sugar, nuts, and similar materials in general and used particularly in the drug and confectionery business and where the most suitable motion to obtain a reduction is a rubbing or grinding one and similar to one as is now attained by the hand-operated pestle and mortar.

The leading feature of my invention is therefore a construction as shown and described and whereby this rubbing motion is practically carried out for the purpose of reducing substances of the kind indicated.

In the following specification, and particularly pointed out in the claims at the end thereof, is found a full description of the invention, together with its operation, parts, and construction, which latter is also illustrated in the accompanying drawings, in which—

Figure 1 is a side view of my improved reducing-mill with parts broken away. Fig. 2 is a top view of the same. Fig. 3 is an enlarged top view of the operating parts, being the rubbers detached. Fig. 4 is a sectional detail view showing one of the rubbers in edge view.

In order to obtain the rubbing motion of the pestle for grinding the material down to the desired reduction, I provide one or more rubbers 7, which are pivotally secured so as to be free to rest during all positions they assume during their motion against the bottom of the receptacle which contains the material to be reduced. This receptacle consists by preference of a bowl 8 of circular shape with a curved bottom. The rubbers 7—two in this case—are each provided with a shank 9, the free end of each of which is pivotally attached to the lower end of an arm 10. This lower end is broadened laterally on each side of the arm, as shown at 11, and the shanks of the rubbers are attached, as shown, on opposite sides of the arm. However, this manner of connection need not be carried out absolutely as to every detail described, the main essential being that the rubbers are free to follow the shape of the bottom of the bowl as they are dragged across the same from one side to the other by arm 10, as shown in dotted lines in Fig. 1, and that while so dragged they are also free to yield sufficiently to permit the material to be ground to pass under them. This requires a capacity to yield upwardly to suit the thickness or grain of such material or layer of it and is by a support which permits motion in a plane substantially at right angles to the inner surface of the bowl or, as shown, in a vertical direction—that is, upwardly.

For moving arm 10 for the purpose indicated I support the same pivotally between its ends, as shown at 12, the rubbers being attached to one end, while the moving power operates at the other end. This power may be derived from any suitable machine elements. As shown, I use a connecting-rod 13, reciprocated by a crank 14 on a shaft 15. Rotation of the latter may be by direct means or by intervention of sprocket-wheels 16 and 17 and a chain 18, sprocket-wheel 16 being mounted on a shaft 15 and the other wheel being mounted on a shaft 19. In order to subject all parts of the contents of bowl 8 to the action of the rubbers, the bowl is rotated at a moderate speed about the center of its vertical axis and for which purpose said bowl is accordingly mounted. In this case I provide a vertical shaft 21, upon the upper end of which the bowl is mounted and which shaft is supported in suitable bearings attached to the general machine-frame. It is rotated by a set of bevel-wheels 22, one mounted on shaft 21 and the other on shaft 19, so that the driving-power for rotating the bowl and agitating the rubbers may be received at one initial driving-point, which may be either one of shafts 15 or 19. In this case shaft 19 is considered to be the driving-shaft, and the same is accordingly rotated, which may be by a pulley 23 or crank 24.

The supporting-point 12 is at one of the upper parts of the frame, and this particular part is in shape of a beam 25, supported at both ends and having midway of these latter a downwardly-extending projection 26, which constitutes the aforesaid point of attachment 12 for arm 10.

By connecting one end of beam 25 pivotally and the other detachable the same, with the rubbers on it, may be swung up, as shown in dotted lines in Fig. 1, and turned over, so as to entirely clear the bowl to permit cleaning the same as well as the operating parts. As a pivot for such purpose I use shaft 15, and on which arm 25 may swing, said shaft being supported in bearings 27 and 28.

The intensity of action of the rubbers is of course proportional to their weight and may therefore be properly arranged by selecting the material and size accordingly. In the present case the material is assumed to be iron.

Having described my invention, I claim as new—

1. In a reducing-mill, the combination of a general frame, a bowl supported thereon, means to rotate the same, rubbers resting normally against the lower part of this bowl, an arm pivotally attached between its ends to a fixed point on the frame and having the rubbers mentioned attached to its lower end and means connecting to its upper end whereby this arm is oscillated in a vertical plane within the bowl and in a manner to reciprocate the rubbers connected to its lower end in the same plane whereby they are dragged back and forth from side of the bowl to the opposite side thereof the connection of the rubbers to the arm being also a pivotal one whereby their contact with the bowl is made a yielding one, their individual motion being in the same plane as the one whereby they are reciprocated by the arm to which they are connected.

2. In a reducing-mill, the combination of a general frame, an arm forming a part of it and supported across the top of the same, a bowl below, means to rotate the same, rubbers to operate in conjunction with the bowl, being normally in contact with the lower part of it, an arm pivotally attached between its ends to the frame-arm above mentioned and to the lower end of which the rubbers are connected, and means to oscillate this arm in a manner whereby the rubbers are dragged in a straight path back and forth over the lower part of the bowl and from one side of the same to the other, the connection of the rubbers to the arms being pivotal so that their contact with the bowl is a yielding one.

3. In a reducing-mill, the combination of a general frame, a shaft supported on the upper part thereof, bearings for it, a frame-arm supported across this frame it being with one of its ends pivotally connected to the shaft mentioned, a bowl supported below this frame-arm, means to rotate it, an arm pivoted between its ends to the frame-arm mentioned and extending with its lower end into the bowl, rubbers pivotally attached to its lower end, operative connection between its upper end and the shaft mentioned whereby said arm is oscillated in a vertical plane and in a manner to cause the rubbers to be dragged with a reciprocating motion across the lower part of the bowl, and means whereby the other end of the frame-arm is detachably held on the general frame so that after disconnected said arm may be swung upwardly to raise the operating parts out of the bowl.

In testimony whereof I hereunto set my signature in the presence of two witnesses.

HERMAN W. BECHT.

Witnesses:
C. SPENGEL,
ALBERT A. MOEBUS.